US011663764B2

(12) United States Patent
Spencer et al.

(10) Patent No.: US 11,663,764 B2
(45) Date of Patent: May 30, 2023

(54) AUTOMATIC CREATION OF A PHOTOREALISTIC CUSTOMIZED ANIMATED GARMENTED AVATAR

(71) Applicant: Spree3D Corporation, Incline Village, NV (US)

(72) Inventors: Gil Spencer, Incline Village, NV (US); Dmitriy Vladlenovich Pinskiy, Woodland Hills, CA (US); Evan Smyth, La Crescenta, CA (US)

(73) Assignee: Spree3D Corporation, Incline Village, NV (US)

( * ) Notice: Subject to any disclaimer, the term of this patent is extended or adjusted under 35 U.S.C. 154(b) by 278 days.

(21) Appl. No.: 17/231,325

(22) Filed: Apr. 15, 2021

(65) Prior Publication Data

US 2022/0237841 A1    Jul. 28, 2022
US 2022/0237841 A1    Jul. 28, 2022

Related U.S. Application Data

(60) Provisional application No. 63/142,294, filed on Jan. 27, 2021.

(51) Int. Cl.
*G06T 13/40* (2011.01)
*G06T 15/20* (2011.01)
(Continued)

(52) U.S. Cl.
CPC .............. *G06T 13/40* (2013.01); *G06F 30/00* (2020.01); *G06N 20/00* (2019.01); *G06T 7/90* (2017.01);
(Continued)

(58) Field of Classification Search
None
See application file for complete search history.

(56) References Cited

U.S. PATENT DOCUMENTS 6,466,215 B1    10/2002   Matsuda et al.
6,546,309 B1     4/2003   Gazzuolo
(Continued)

FOREIGN PATENT DOCUMENTS

CN         110930500 A      3/2020
WO       2014161429 A1     10/2014
(Continued)

OTHER PUBLICATIONS

Burkov, "Neural Head Reenactment with Latent Pose Descriptors", Procedings of the IEEE/CVF Conference on Computer Vision and Pattern Recognition (CVPR) 2020, pp. 13766-13795; Oct. 30, 2020. https://arxiv.org/pdf/2004.12000.
(Continued)

*Primary Examiner* — Kee M Tung
*Assistant Examiner* — Jed-Justin Imperial
(74) *Attorney, Agent, or Firm* — Edward J. Radio; Radio & Su

(57) ABSTRACT

Provided are methods and systems for automatic creation of a customized avatar animation of a user. An example method commences with receiving production parameters and creating, based on the production parameters, a multidimensional array of a plurality of blank avatar animations. Each blank avatar animation has a predetermined number of frames and a plurality of features associated with each frame. The method further includes receiving user parameters including body dimensions, hair, and images of a face of a user. The method continues with selecting, from the plurality of blank avatar animations, two blank avatar animations closest to the user based on the body dimensions. The method further includes interpolating corresponding frames of the two blank avatar animations to produce an interpolated avatar animation. The method continues with compositing the face and the hair with the interpolated
(Continued)

avatar animation using a machine learning technique to render the customized avatar animation.

20 Claims, 9 Drawing Sheets

(51) Int. Cl.
    G06T 7/90       (2017.01)
    G06T 19/20     (2011.01)
    G06N 20/00    (2019.01)
    G06F 30/00     (2020.01)

(52) U.S. Cl.
    CPC ............ *G06T 15/205* (2013.01); *G06T 19/20* (2013.01); *G06T 2207/30201* (2013.01); *G06T 2215/16* (2013.01); *G06T 2219/2016* (2013.01)

(56) References Cited

U.S. PATENT DOCUMENTS

| | | | |
|---|---|---|---|
| 6,731,287 | B1 | 5/2004 | Erdem |
| 10,255,681 | B2 | 4/2019 | Price et al. |
| 10,936,853 | B1 | 3/2021 | Sethi et al. |
| 2007/0091085 | A1 | 4/2007 | Wang et al. |
| 2007/0188502 | A1 | 8/2007 | Bishop |
| 2009/0066700 | A1 | 3/2009 | Harding et al. |
| 2013/0100140 | A1 | 4/2013 | Ye et al. |
| 2013/0314412 | A1 | 11/2013 | Gravois et al. |
| 2016/0163084 | A1 | 6/2016 | Corazza et al. |
| 2016/0247017 | A1 | 8/2016 | Sareen et al. |
| 2016/0284018 | A1 | 9/2016 | Adeyoola et al. |
| 2017/0004657 | A1 | 1/2017 | Zagel et al. |
| 2017/0080346 | A1* | 3/2017 | Abbas ............... A63F 13/79 |
| 2018/0047200 | A1* | 2/2018 | O'Hara ............ G06V 40/165 |
| 2018/0197347 | A1 | 7/2018 | Tomizuka |
| 2018/0240280 | A1 | 8/2018 | Chen et al. |
| 2018/0240281 | A1 | 8/2018 | Vincelette |
| 2019/0287301 | A1 | 9/2019 | Colbert |
| 2019/0371032 | A1 | 12/2019 | Scapel et al. |
| 2020/0126316 | A1 | 4/2020 | Sharma et al. |
| 2020/0234508 | A1 | 7/2020 | Shaburov et al. |
| 2020/0258280 | A1* | 8/2020 | Park ..................... G06F 3/011 |
| 2020/0294294 | A1 | 9/2020 | Petriv et al. |
| 2020/0306640 | A1 | 10/2020 | Kolen et al. |
| 2020/0320769 | A1 | 10/2020 | Chen et al. |
| 2020/0334867 | A1 | 10/2020 | Chen et al. |
| 2020/0346420 | A1 | 11/2020 | Friedrich |
| 2020/0364533 | A1 | 11/2020 | Sareen et al. |
| 2020/0402307 | A1 | 12/2020 | Tanwer et al. |
| 2021/0049811 | A1 | 2/2021 | Fedyukov et al. |
| 2021/0150187 | A1 | 5/2021 | Karras et al. |
| 2021/0303919 | A1 | 9/2021 | Niu |

FOREIGN PATENT DOCUMENTS

| | | |
|---|---|---|
| WO | 2017143392 A1 | 8/2017 |
| WO | 2018089039 A1 | 5/2018 |
| WO | 2018154331 A1 | 8/2018 |
| WO | 2019050808 A1 | 3/2019 |
| WO | 2019164266 A1 | 8/2019 |
| WO | 2020038254 A1 | 2/2020 |

OTHER PUBLICATIONS

Deng, "Disentangled and Controllable Face Image Generation via 3D Imitative-Contrastive Learning", Computer Vision Foundation Conference, Proceedings of the IEEE/CVF Conference on Computer Vision and Pattern Recognition (CVPR) 2020, pp. 5154-5163; open access version, https://arxiv.org/abs/1904.01909.

Tripathy, "ICface: Interpretable and Controllable Face Reenactment Using GANs", Proceedings of the IEEE/CVF Winter Conference on Applications of Computer Vision (WACV) 2020, pp. 3385-3394; Jan. 17, 2020. https://arxiv.org/abs/1904.01909.

Huang, "Learning Identity-Invariant Motion Representations for Cross-ID Face Reenactment", Procedings of the IEEE/CVF Conference on Computer Vision and Pattern Recognition (CVPR) 2020, pp. 7084-7092, 2020, open access version, https://openaccess.thecvf.com/content_CVPR_2020/html/Huang_Learning_Identity-Invariant_Motion_Representations_for_Cross-ID_Face_Reenactment_CVPR_2020_paper.html.

Thies, "Face2Face: Real-Time Face Capture and Reenactment of RGB Videos", Jul. 29, 2020; abstract of this paper published in 2016 by IEEE at https://ieeexplore.ieee.org/document/7780631.

Zhao, "Joint face alignment and segmentation via deep multi-task learning", published in Multimedia Tools and Applications 78, 13131-13148 (2019), published by Springer Nature, 1 New York Plaza, Suite 4600, New York, NY 10004-1562, U.S.A., Jan. 12, 2018 https://doi.org/10.1007/s11042-018-5609-1.

Li, "FaceShifter: Towards High Fidelity and Occlusion Aware Face Swapping", Peking University and Microsoft Research, Sep. 15, 2020. lililngzhi@pku.edu.cn and jianbao.haya.doch.fangwen@microsoft.com; pdf version available at: https://arxiv.org/pdf/1912.13457.pdf.

Nirkin, "FSGAN: Subject Agnostic Face Swapping and Reenactment", Computer Vision Foundation, ICCV 2019, open access version, Aug. 2019, https://arxiv.org/pdf/1908.05932.pdf ; also published in Proceedings of the IEEE International Conference on Computer Vision, pp. 7184-7193 and on Yuval Nirkin's website: https://nirkin.com/fsgan/.

Naruniec, "High-Resolution Neural Face Swapping for Visual Effects", Eurographics Symposium on Rendering 2020, vol. 39 (2020), No. 4. https://studios.disneyresearch.com/wp-content/uploads/2020/06/High-Resolution-Neural-Face-Swapping-for-Visual-Effects.pdf; also published by the Eurographics Association, c/o Fiduciare A. Richard SA, Avenue de Frontenex 32, 1207 Geneva, Switzerland, IDA CHE-100.558.3722020 https://diglib.eg.org/andle/10.2312/2632924.

Wawrzonowski et al. "Mobile devices' GPUs in cloth dynamics simulation", Proceedings of the Federated Conference on Computer Science and Information Systems, Prague, Czech Republic, 2017, pp. 1283-1290. Retrieved on Feb. 23, 2022. Retrieved from UKL: https://annals-csis.orgVolume_11/drp/pdf/191.pdf.

Lewis et al., "Pose Space Deformation: A Unified Approach to Shape Interpolation and Skeleton-Driven Deformation", SIGGRAPH 2000, New Orleans, Louisiana, USA, pp. 165-172.

Neophytou et al., "Shape and Pose Space Deformation for Subject Specific Animation", Centre for Vision Speech and Signal Processing (CVSSP), University of Surrey, Guildford, United Kingdom; IEEE Conference Publication, IEEE Xplore, 2013, 8 pages.

"Pose space deformation," article in Wikipedia, downloaded Jul. 29, 2022, 2 pages.

Kim et al., "Deep Video Portraits", ACM Trans. Graph. vol. 37, No. 4, Article 163; published online May 29, 2018, pp. 163:1-14; Association for Computing Machinery, U.S.A. https://arxiv.org/pdf/1805.11714.pdf.

Goes, F. et al., "Garment Refitting for Digital Characters", SIGGRAPH '20 Talks, Aug. 17, 2020, Virtual Event, USA; 2 pages. ACM ISBN 978-1-4503-7971-7/20/08. https://doi.org/10.1145/3388767.3407348.

* cited by examiner

AUTOMATIC CREATION OF A PHOTOREALISTIC CUSTOMIZED ANIMATED GARMENTED AVATAR

CROSS REFERENCE TO RELATED APPLICATIONS

The present application claims priority of U.S. Provisional Patent Application No. 63/142,294 filed on Jan. 27, 2021, entitled "Automatic Creation of a Photorealistic Customized Animated Garmented Avatar for a Person," which is incorporated herein by reference in its entirety for all purposes.

TECHNICAL FIELD

The present disclosure pertains to automatic generation of a photorealistic customized computer animation (video) of a user wearing one or more selected cloth garments and/or accessories, in a selected scene.

BACKGROUND

In online shopping, a customer usually selects cloth garments and/or accessories based on a size and preferences of the customer. Online shopping websites conventionally provide pictures of a garment on a model and a size table for the garment. To have a rough estimate of how the garment would look on the customer, the customer needs to compare customer measurements with a size of the model and imagine how the garment could look on the customer. However, the realistic look of the garments on the customer may differ from the look of the garments on the model. Therefore, the customers may be unsatisfied by the garments and return the garments back to a seller.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an example embodiment, a system for automatic creation of a customized avatar animation of a user is provided. The system may include a production module and a runtime module. The production module may be configured to receive production parameters and create, based on the production parameters, a multidimensional array of a plurality of blank avatar animations. Each blank avatar animation may have a predetermined number of frames and a plurality of features associated with each frame. The runtime module may be configured to receive user parameters. The user parameters may include body dimensions, hair, and images of a face of a user. The runtime module may be configured to select two blank avatar animations from the plurality of blank avatar animations. The two blank avatar animations may be closest to the user based on the body dimensions. The runtime module may be further configured to interpolate corresponding frames of the two blank avatar animations to produce an interpolated avatar animation. The runtime module may be configured to composite the face and the hair with the interpolated avatar animation using a machine learning technique to render the customized avatar animation.

According to another embodiment, a method for automatic creation of a customized avatar animation of a user is provided. The method may commence with receiving production parameters by a production module. The method may further include creating, by the production module, based on the production parameters, a multidimensional array of a plurality of blank avatar animations. Each blank avatar animation may have a predetermined number of frames and a plurality of features associated with each frame. The method may further include receiving, by a runtime module, user parameters. The user parameters may include body dimensions, hair, and images of a face of a user. The method may continue with selecting, by the runtime module, two blank avatar animations from the plurality of blank avatar animations. The two blank avatar animations may be the closest ones to the user based on the body dimensions. The method may further include interpolating, by the runtime module, corresponding frames of the two blank avatar animations to produce an interpolated avatar animation. The method may then continue with compositing, by the runtime module, the face and the hair with the interpolated avatar animation using a machine learning technique to render the customized avatar animation.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
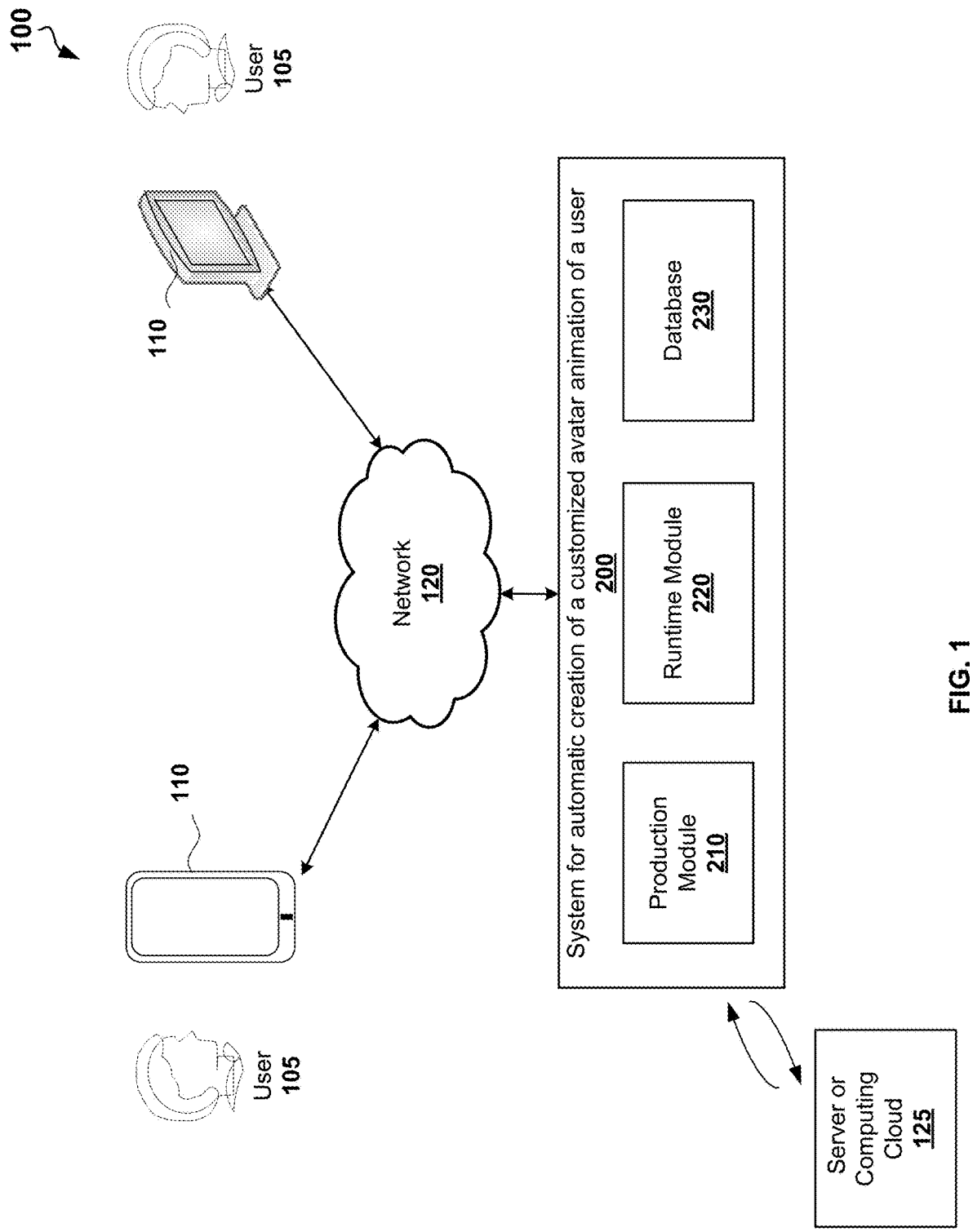
FIG. 1 is a block diagram of an environment, in which systems and methods for automatic creation of a customized avatar animation of a user can be implemented, according to some example embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present disclosure provides systems and methods for automatic creation of a customized avatar animation of a user. A system for automatic creation of a customized avatar animation of a user (also referred to herein as "system") may preliminarily create a multidimensional array of animated three-dimensional avatars (also referred to as avatar animations). Each blank avatar animation may correspond to one predetermined body size, such as small, medium, or large, a body length, and other body parameters. The plurality of animated three-dimensional avatars may be generated for each garment provided for selection through a website. Specifically, a garment may be represented in form of a three-dimensional animated garment worn by the animated three-dimensional avatar.

The user experience can begin with a user taking at least two pictures of the user, such as a front view picture and a side view picture and providing the two pictures to the system. The system analyzes the two pictures received from the user to determine body dimensions of the user. In an example embodiment, the system provides 70 mm-accurate dimensions of the user. Upon determining the body dimensions of the user, the system selects two blank avatar animations that are the closest to the dimensions of the user, interpolates the selected blank avatar animations, and generates an interpolated avatar animation based on the body dimensions of the user. The interpolated avatar animation has dimensions of the avatar that correspond to the dimensions of the user. The system can use a machine learning technique to composite a face and hair of the user taken from the pictures of the user with the interpolated avatar animation and generate a customized avatar animation associated with the user. Therefore, the customized avatar animation generated by the system is a "digital double" of the user in the form of a three-dimensional (3D) avatar (3D model) generated based on the size and other parameters of the user.

The user can then customize the digital double in real time with augmented reality (AR) tools, such as by adding makeup, changing hairstyle, adding a scene, and so forth.

The user can then select one or more garments for the 3D avatar to wear from their own closet, closet of an influencer, or from a clothing brand. The user can also resize the garment, select shoes, and select accessories. Furthermore, the user may select a scene (e.g., a background environment) in which the 3D avatar needs to be located. In exemplary embodiments, the scene may include a runway, private jet, yacht, party, club, and the like. In an example embodiment, the system may generate the customized avatar animation of the user in the form of a still photo, 3D object, or virtual reality (VR)/AR interactive scene and photorealistically render the customized avatar animation. A physics simulation may be run on the garment so that the garment may flow in a realistic manner as the avatar moves. The final customized avatar animation can then be streamed to a user device.

FIG. 1 shows an example environment 100, in which a system and a method for automatic creation of a customized avatar animation of a user can be implemented. The environment 100 may include one or more users 105, one or more personal computing devices also referred to as user devices 110 associated with the users 105, a network 120, a system 200 for automatic creation of a customized avatar animation of a user, and a server or computing cloud 125. The user devices 110 can refer to a mobile device such as a mobile phone, smartphone, or tablet computer. In further embodiments, the user devices 110 can refer to a personal computer, laptop computer, netbook, or any other computing device.

The user devices 110 can be communicatively connected to the system 200. The system 200 can be implemented as a cloud-based computing resource(s). The system 200 may be in communication with the server or computing cloud 125. The server or computing cloud 125 can include computing resources (hardware and software) available at a remote location and accessible over the data network 120. The server or computing cloud 125 can be communicatively coupled to the user devices 110 via the data network 120. The server or computing cloud 125 can be shared by multiple user(s) 105. In certain embodiments, the server or computing cloud 125 may include one or more server farms/clusters including a collection of computer servers that can be co-located with network switches and/or routers. The system 200 may include a production module 210, a runtime module 220, and a database 230.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network), Wi-Fi™ network, and so forth.

Figure 2:
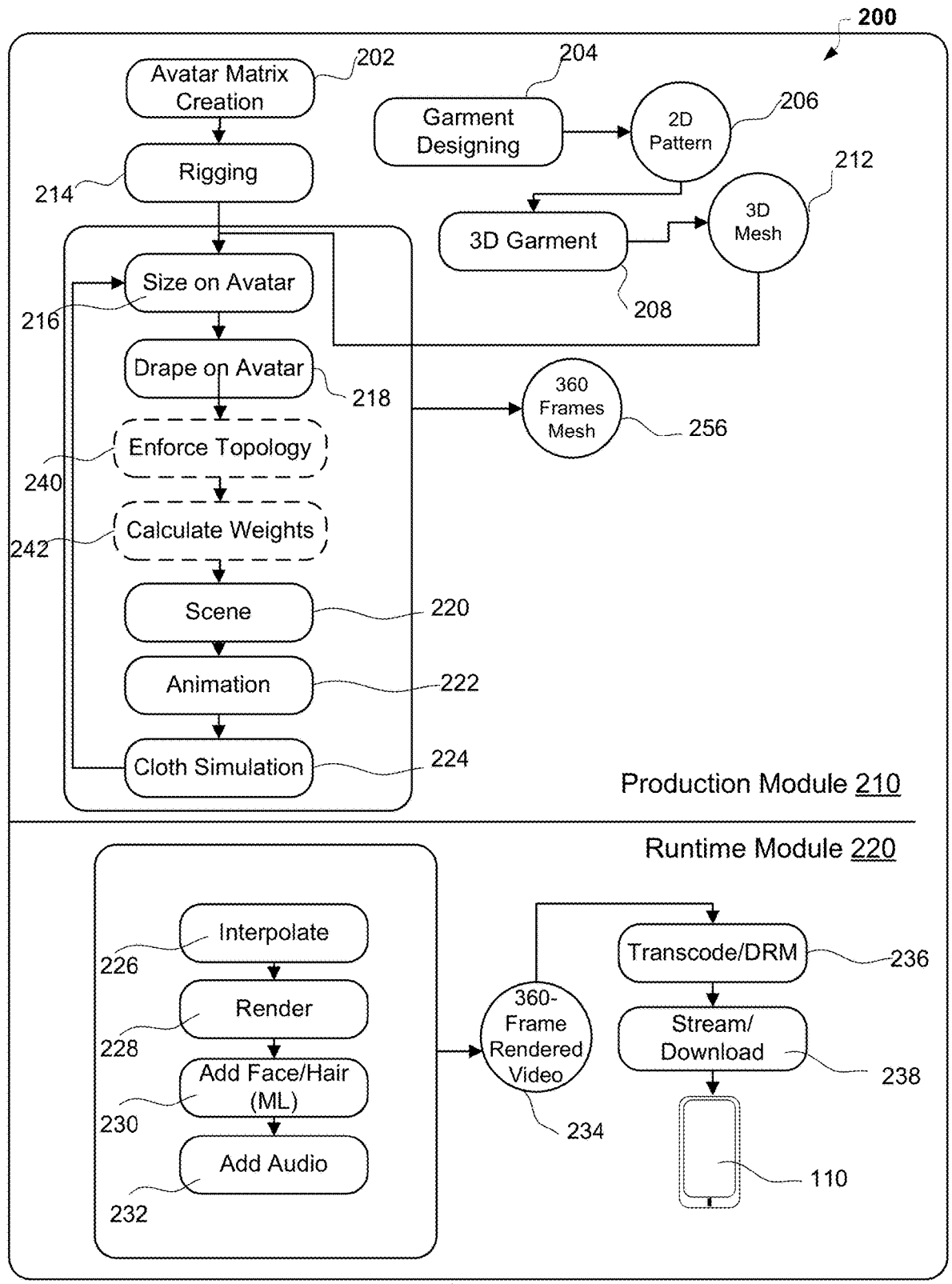
FIG. 2 depicts a workflow that may be utilized by a system for automatic creation of a customized avatar animation of a user, according to an example embodiment.

FIG. 2 depicts an exemplary workflow that can be utilized by modules of a system 200 for automatic creation of a customized avatar animation of a user, according to an example embodiment. Embodiments of the present disclosure provide for the customized computer animation to be generated by the system 200 in substantially real time (e.g., up to 15 seconds) for thousands of users at a same time, with minimal to no human intervention. To produce the customized avatar animations, parts of the process can be conducted in advance in a production workflow by a production module 210 of the system 200, and other parts of the process may be conducted in real-time in a runtime workflow by a runtime module 220 of the system 200. The production module 210 and the runtime module 220 may also produce other digital assets, such as an AR/VR scene, 3D object, and still images/photos.

In the production workflow, the system 200 creates scenes, garments, and avatars. In the runtime workflow, the system 200 determines which pre-generated avatars are closest in shape and dimensions to the user, and interpolates the closest avatars based on multiple dimensions of the user to generate an avatar representing the user. Each of these workflows is discussed in further detail below.

Production Workflow.

The production module 210 may be configured to receive production parameters. The production parameters may include parameters for creating animated 3D avatars. Based on the production parameters, the production module may create a multidimensional array of a plurality of blank avatars. The multidimensional array is a matrix of pre-generated 3D avatars (3D models) as shown in block 202. Each blank avatar may have a predetermined number of frames and a plurality of features associated with each frame. In an example embodiment, the features may include a position of a body, position of body parts, color, lighting, presence of objects, tone, and so forth.

In exemplary embodiments, the multidimensional array is a matrix of 20 pre-generated avatars of different body shapes. Each of the pre-generated avatars may be provided with a garment proportionally sized based on body dimensions of the avatar. Garments may include clothes, accessories, shoes, and so forth, and may be provided by or associated with a seller, brand owner, advertiser, and so forth. The garments may be created by a garment designer as shown in block 204. Each garment may be first designed as a 2D pattern 206. Based on the 2D pattern 206, 3D garments 208 may be created. The 3D garments 208 may include 3D models of garments. Based on the 3D garments 208, a 3D mesh 212 of garments may be created. In exemplary embodiments, the 3D model of a garment that is input into the system 200 is based on a 3D computer-aided design (CAD) design of the garment. In other embodiments, the 3D model of a garment is derived from photogrammetry techniques.

The avatars may be pre-generated for each garment. While in one embodiment, 20 avatars are used, there can be fewer or more avatars in other embodiments, in a matrix of n×m size, where n is the number of avatar sizes and m is the number of garments.

Figure 3:
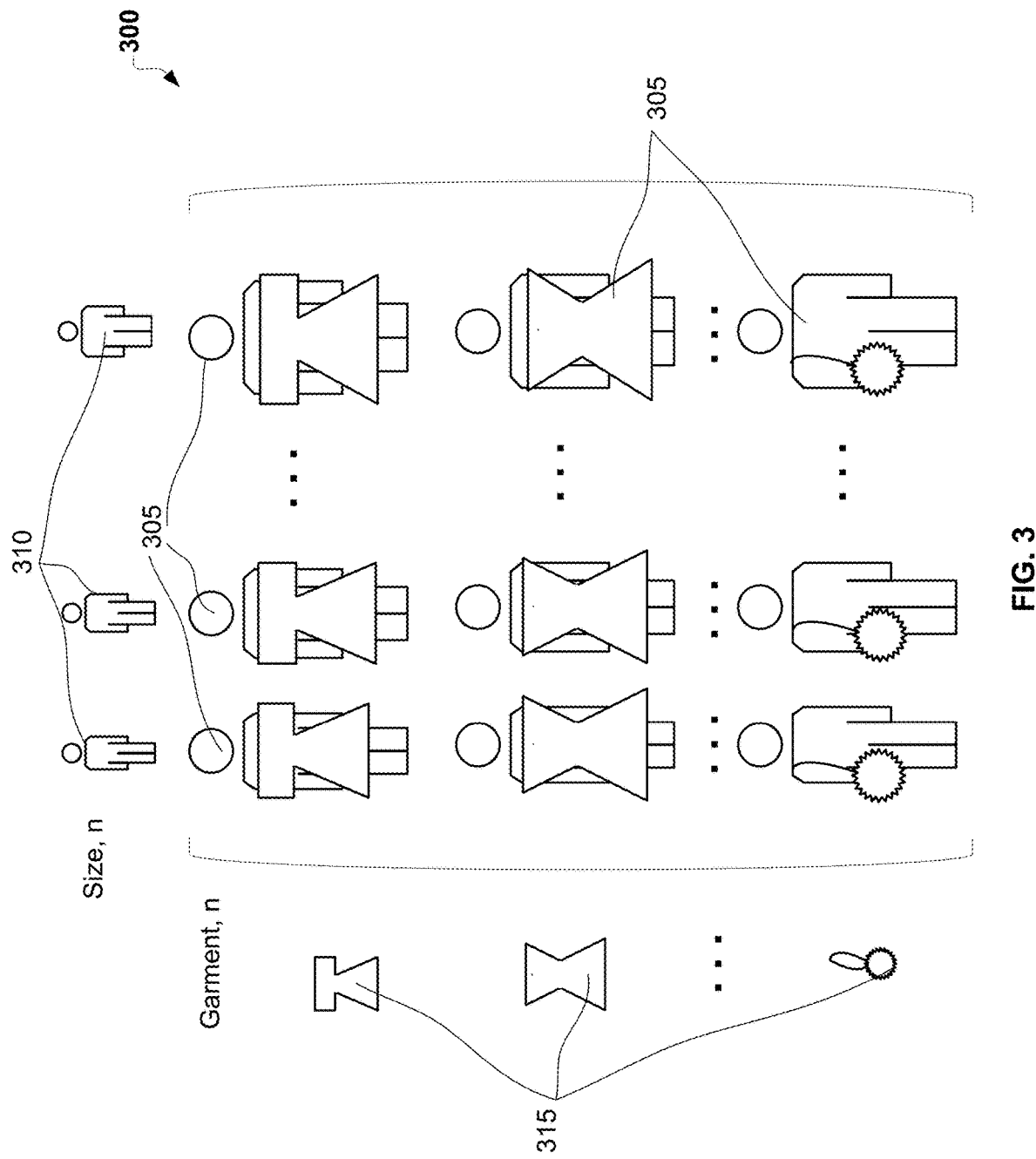
FIG. 3 shows a matrix of pre-generated garmented avatars, according to an example embodiment.

FIG. 3 shows a matrix 300 of n pre-generated garmented avatars, according to an example embodiment. The matrix 300 may include a multidimensional array of pre-generated avatars 305. The avatars 305 may be generated based on different body shapes 310. The avatars 305 can be generated for each garment 315, thereby creating the multidimensional array of pre-generated avatars 305.

Referring back to FIG. 2, the avatars from the matrix of blank avatars may be (skeletally) rigged as shown in block 214. In computer animation, rigging (also referred to as skeletal animation) is a technique in which an articulated object (e.g., a body) is represented by a surface representation used to draw the object (called the mesh or skin) and a hierarchical set of interconnected parts (called bones, and collectively forming the skeleton or rig) that act as a virtual armature used to animate (pose and keyframe) the mesh. Upon rigging, bones and joints are added to the 3D model of the avatar, such that the avatar has the ability to move the way that the bones and joints move, to produce a more realistic human-like animation.

Upon rigging and creating the 3D mesh of garments, the garments are added to the avatars and sized based on the sizes of the avatars, as shown in block 216.

Each of 3D garments 208 is further draped in block 218 on each avatar. After the garments 208 are draped onto the avatars, a uniform topology can be enforced in an optional block 240 and weights for the garments can be calculated in an optional block 242. A scene is added to each avatar in block 220, and each of the 3D garments 208 is animated in block 222 using the cloth physical simulation in block 224, resulting in 20 animated videos of garmented avatars for each garment. Thus, based on the production parameters, a multidimensional array of a plurality of blank avatar animations can be created, where each blank avatar animation has a predetermined number of frames and a plurality of features associated with each frame.

Furthermore, the production module 210 or the runtime module 220 can be further configured to capture a skin color from the images of the face or images of a body of the user. Based on the skin color, the production module 210 or the runtime module 220 may assign weights to skin tones of different body parts of avatars. The weights can be determined in the optional block 242. An algorithm may automatically determine, based on the skin tone of a user cheek, a corresponding skin color for other body parts such as front of hands, back of hands, and so forth. The skin tone is not consistent across all body parts for most people, so the algorithm calculates weights for the skin on different body parts and allows a realistic rendering of the skin tone to be utilized for the 3D avatar of the user.

For an exemplary 15 second animation, the matrix of avatars includes garmented avatars running through a 360 frame animation for 15 seconds (24 frames per second results in 360 frames for 15 seconds) shown as a 360 frame mesh 256. Specifically, the 360 frames may be composed into a 15 second animated video. As discussed herein, instead of a 360 frame animation, exemplary embodiments may produce 3D objects, AR/VR sequences, or stills pictures, as outputs.

Therefore, to ensure performance and quality, a matrix of pre-generated avatars is created for each garment. Having the matrix pre-generated in the production workflow prevents collisions between the garment and body parts that may occur when generating the animation for a user in real time at runtime. The production workflow ensures that all the garments are perfectly draped on the avatars during the production, the garments fit well the avatars, the garments are of the proper size, and no unwanted body parts are visible on the garmented avatar.

In some embodiments, accessories can be added to the avatars, which increases the size of the matrix. For example, if a tall shoe option and a low shoe option is added to each avatar, the size of the matrix is doubled. If a flat shoe option, mid heel shoe option, and tall heel shoe option is added to each avatar, the matrix triples in size. Similarly, if a purse or any other accessory is added to each avatar, the size of the matrix is multiplied. Further, for certain types of accessories, a same matrix can be utilized but with different animations. For example, if an avatar is holding a clutch or a purse, then the matrix needs to be expanded by adding the animated avatar in which the arm position of the animated avatar needs to be adjusted accordingly.

Another aspect of the production workflow is the cloth simulation while the avatar is moving. For example, if the animation includes a user walking down a runway and then does a 360 degree twirl, the garment will flow in a very specific way. In case of a long flowy dress, the cloth behaves a certain way and when the avatar twirls the cloth behaves in a different way. The physics simulation of how the garment moves with the avatar based on the weight of the cloth, and the garment and the animation, is a time-expensive calculation and a compute expensive calculation. Moving this step to the production workflow simplifies and speeds up the runtime workflow, enabling the system 200 to generate the garmented avatar for the user based on user parameter more quickly because the physics simulation has been already done. With the pre-generated cloth simulation, the system 200 produces a matrix of animated/simulated garmented avatars, and can choose between the avatars for 360 frames at runtime. While 360 frames are discussed herein as one example embodiment, there can be fewer or more frames in other embodiments. The techniques disclosed herein can be utilized to generate a photorealistic garmented avatar simulation of any length of time, any number of frames, and any number of frames per second.

Runtime Workflow.

When a user begins to use the system 200, the runtime module 220 of the system 200 receives user parameters of the user. The user parameters may include body dimensions, hair, and images of the face of the user. In some example embodiments, the production parameters and the user parameters may further include one or more of the following: a scenario, a body position, a makeup, shoes, an accessory, an audio, a texture for the garment, a user video, a color of a garment, a user created garment, a pre-rolled video, and so forth. The scenario may include one or more of the following: a private jet scene, a yacht scene, a party scene, a club scene, and the like. In an example embodiment, the user parameters may be determined based on one or more images of a body of the user. Specifically, the user may use a user device to provide two images to the system 200, for example, a front picture and a side picture of the user. In some embodiments, the user may also provide the body dimensions (e.g., height, chest measurement, waist measurement, hips measurements, wrist measurement, and so forth). An application associated with the system 200 may be running on the user device. The runtime module 220 may analyze the images of the user and capture body dimensions of the user based on the images. The images of the user may be analyzed. Based on the analysis, 70 mm-accurate dimensions of the body of the user may be determined.

Then, the runtime module 220 may select two blank avatar animations from the plurality of blank avatar animations pre-generated by the production module. The two blank avatar animations selected by the runtime module 220 may be the closest to the user based on the body dimensions. Specifically, the runtime module 220 can retrieve the matrix of animated videos of garmented avatars and selects two sample avatars that are closest in size to the dimensions of the user body. The two closest avatars in size may be one size smaller and one size larger than the size of the user.

The runtime module 220 may interpolate corresponding frames of the two blank avatar animations to produce frames of an interpolated avatar animation. Specifically, the animated videos for the two sample avatars with garments on them may be interpolated frame by frame in block 226 to create frames of a customized animated video of an avatar of the user. The weights for the interpolation can be calculated in the optional block 242. An exemplary 15 second animated video results in 360 frames for each of the two blank avatar animations that are interpolated at runtime. The avatar of the user as well as the garment draping may be both interpolated at the same time, during the frame-by-frame creation of the garmented interpolated avatar animation. The interpolated avatar animation may be skeletally rigged.

Figure 4A:
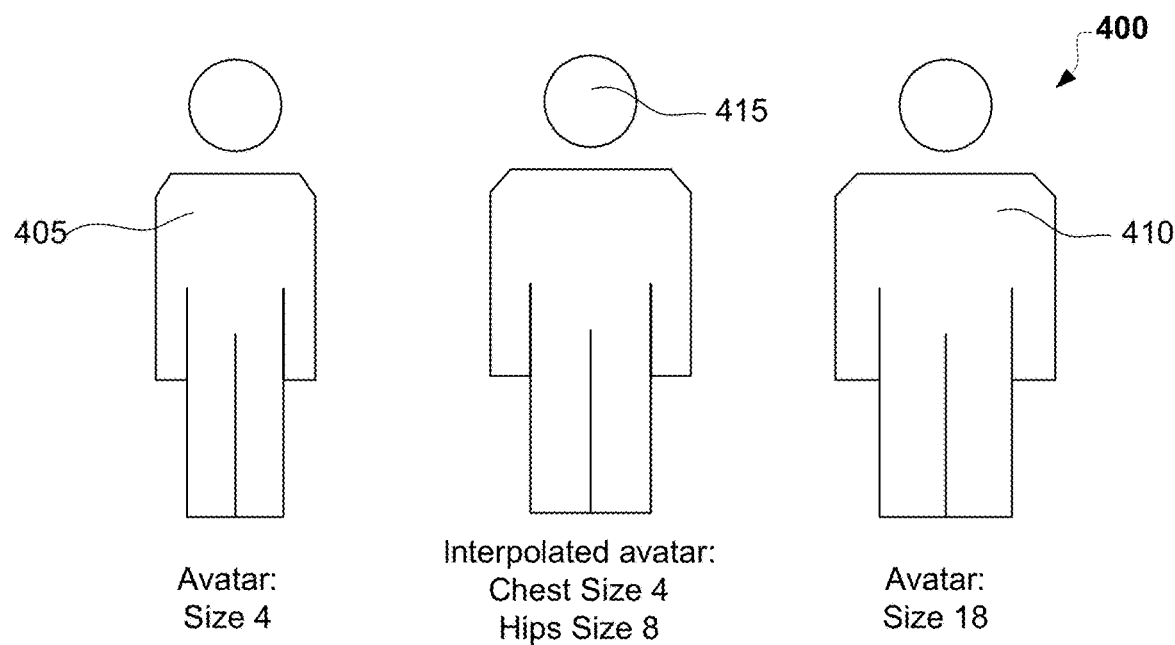
FIGS. 4A and 4B are schematic diagrams illustrating the creation of an interpolated avatar, according to an example embodiment.
Figure 4B:
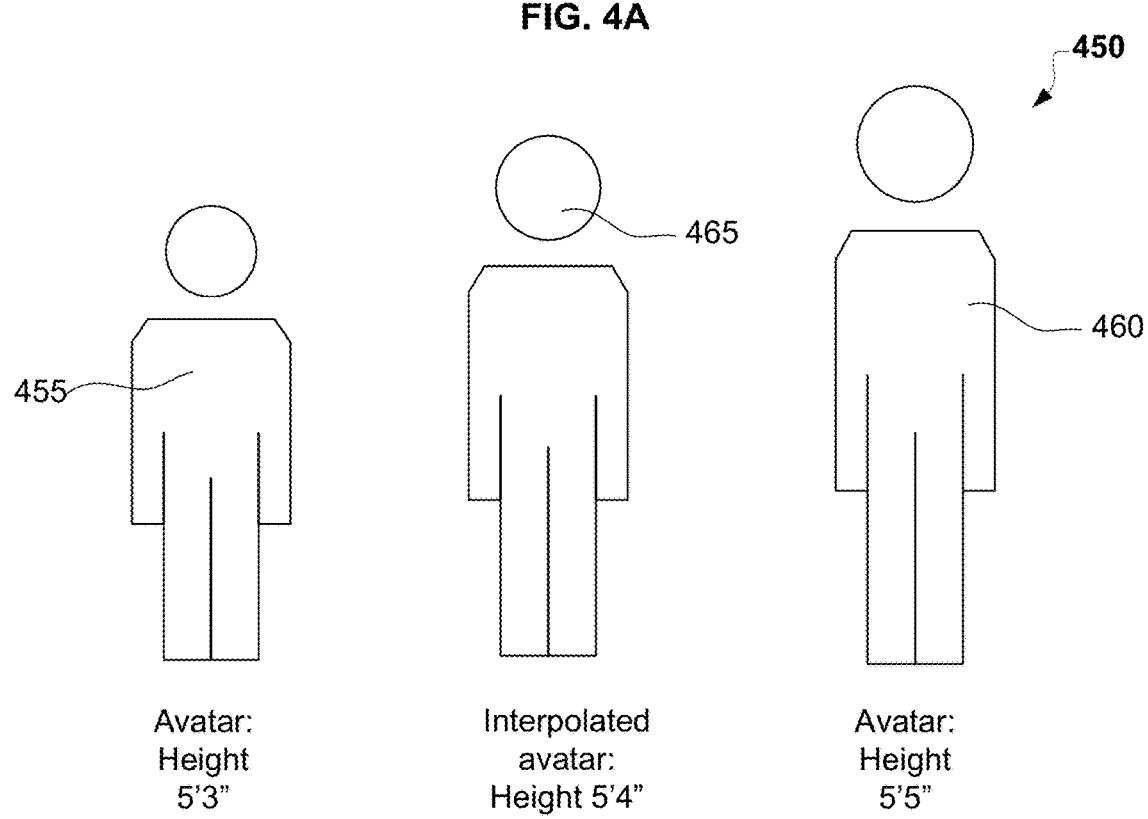

FIGS. 4A and 4B are schematic diagrams 400 and 450 illustrating the creation of an interpolated avatar, according to an example embodiment. The system may receive body parameters of the user, for example, a chest of size 4 and hips of size 18. As shown in FIG. 4A, the system may select two blank avatar animations closest to the user based on the body dimensions. Specifically, the system may select a blank avatar animation 405 having a chest and hips of size 4 and a blank avatar animation 410 having a chest and hips of size 18. The system may interpolate the blank avatar animation 405 and the blank avatar animation 410 to generate an interpolated avatar animation 415 having the body parameters of the user, namely a chest of size 4 and hips of size 18.

The system may receive body parameters of the user, for example, a height of the user of 5'4". As shown in FIG. 4B, the system may select two blank avatar animations closest to the user based on the body dimensions. Specifically, the system may select a blank avatar animation 455 having a height of 5'3" and a blank avatar animation 460 having a height of 5'5". The system may interpolate the blank avatar animation 455 and the blank avatar animation 460 to generate an interpolated avatar animation 465 having the body parameters of the user, namely, the height of 5'4".

Referring again to FIG. 2, after the animated video of a user body wearing the garment is generated, a face and hair of the user may be customized onto the animated video. To this end, the runtime module 220 can use a machine learning technique to composite the face and the hair with the interpolated avatar animation in order to render the customized avatar animation. In an example embodiment, the machine learning may include Generative Adversarial Network (GAN). The customized avatar animation may be in the form of a 360-frame rendered video 234 (15 second animation). In an example embodiment, the pre-rendered accessories and scenes may be composited into the interpolated avatar animation as well.

By utilizing the matrix of pre-generated avatars as a starting point, at runtime the system 200 can simply run an interpolation algorithm, add a face and hair, and then render the interpolated avatar animation. This is a much simpler process than having to generate a garmented avatar at runtime for the user in real time.

After the interpolation algorithms are run, the garmented avatar of the user in form of the customized avatar animation may be rendered in block 228. The rendering may be performed in a cloud server, on graphics processing units (GPUs) in a cloud farm, or on the user device. The rendering can be scaled dynamically. In an example embodiment, the rendered customized avatar may have a blank or stock face image and may be bald (no hair). At a later time, using deep learning and/or other machine learning algorithms, the face and hair of the user may be added in step 230 to the customized avatar animation. In exemplary embodiments, machine learning techniques such as the GAN can be utilized to composite the face and hair onto the animated garmented avatar in the customized avatar animation.

The face and hair of the user can be added to the animated garmented avatar as a post-production step. That is, the animated garmented avatar can be rendered with a blank face. The face of the user may be available to the system from images received from the user. Using machine learning algorithms, the face can be composed with the customized avatar animation of the garmented avatar for the user. Algorithmic models may be optimized and trained during the production and inference algorithms and GANs can be run at runtime to transfer the face of the user from a still image or a short video onto the customized avatar animation.

In another embodiment, the avatar animation can be pre-rendered without any garments, just a naked avatar moving such that an exact position of the face and hair can be determined. Once the dimensions of the user are received, blank avatars can be interpolated and a naked avatar of the user can be rendered. Upon generation of the avatar, the system 200 can create a video of only the face and hair of the user. Using machine learning algorithms, models, training, and inferences, the GANs can generate and then composite the face and hair of the user onto the target customized avatar animation. Thus, this provides a parallel flow where the face and hair can be generated in parallel to the generation of the interpolated avatar animation, instead of adding the face and hair to the interpolated avatar animation in a second step after the generation of the interpolated avatar animation. This allows the system 200 to only have to composite the scene in the final step of the process, instead of having to run machine learning algorithms in the final step of the process.

In a further embodiment, the face and hair of the user may be captured as a 3D image and added to the avatar using machine learning algorithms. This may occur in a parallel process to the rendering of the customized avatar animation.

In some embodiments, the customized avatar animation can be pre-rendered without garments when the user body dimensions are received by the system 200. In this embodiment, the customized avatar animation can be pre-rendered with no garment (naked) to get a head position of the user. The face and hair of the user can be rendered in parallel to the generation of the naked avatar. As soon as the face and hair are received by the system, the system may start running the machine learning algorithm to generate the final customized avatar animation faster.

In the final step, audio can be added to the rendered scene with the customized avatar animation in block 232. In some embodiments, the user can select the audio that needs to be added to the scene. In other embodiments, many different types of user-generated content can be available for the user to add to the rendered scene. For example, the user can manipulate texture of the garment by providing, for example, videos of the garment texture, thus allowing the avatar to do things in the digital world that are not possible in the real world. For example, instead of having simple plaid pattern on a garment, the avatar can have moving plaid, or a texture of the garment may be shown. Furthermore, user-generated content can include the ability for users to change the colors of the garment and create their own garments, shoes, accessories, and so forth. There are many different types of user-generated content that can be added to the rendered avatar in various embodiments.

In some embodiments, the customized avatar animation may begin with a view of the user walking down a runway of a fashion show on stage. While the user waits for the customized garmented avatar to be generated (typically up to 15 seconds), a pre-roll video may be rendered and shown to a user. In one example, the pre-roll video may include a scene of a fashion show. The pre-roll video may be a first person view showing what the user might view before the selected scene of the customized avatar animation starts. In the example of a fashion show scene, the pre-roll video may show what the user sees as they drive up to the fashion show in a limousine, walk down a red carpet with paparazzi, past the bouncers, big lights, and then onto the stage. The rendered animated scene can be customized for the user (i.e., the customized avatar animation).

As mentioned earlier, the rendering and/or compositing steps may occur on the user device 110, in certain embodiments. In some embodiments, 3D objects may be sent to a cloud/cloud farm and animation and mesh generation can be calculated there. In the case of the AR or VR output, mesh animations may be sent to the cloud/cloud farm along with a material, lighting, and texturing list, and final rendering and compositing may occur on the user device.

After the final customized avatar animation has been generated for the user, customized avatar animation can be sent to the user device 110 for viewing via streaming or downloading in block 238 from a web browser or a dedicated software application operating on the user device 140. The animation may further be encoded with one or more of: a compression technique, digital rights management information, encryption, blockchain, digital signature. Upon adding the customized avatar animation to the blockchain, the customized avatar animation may be digitally signed and a digital asset can be created. The digital asset can be shared and/or marketed. In some embodiments, the output video from the web services or on the user device may be transcoded or resized in block 236 based on the parameters of the user device.

Additionally, the band, quality, and/or resolution parameters may be adjusted to allow for optimal playback on the user device based on the size, processor, capabilities, current network availability, or other capacity limitations of the user device. The runtime module 220 may be further configured to perform one or more of the following actions on the customized avatar animation: render in a cloud on graphics processing units and cloud farms, scale based on demand, encode with a compression technique, encrypt, copy, protect, add to a blockchain, digitally sign, stream through an application on a mobile device or a web application, tag, and so forth.

Thus, the system 200 can receive dimensions of a user body and a 3D model of a garment as an input and output a photorealistic dressed avatar of the user that can be animated. In some embodiments, the output animation can be interactive. In other embodiments, multiple people may be placed in a scene together.

Figure 5:
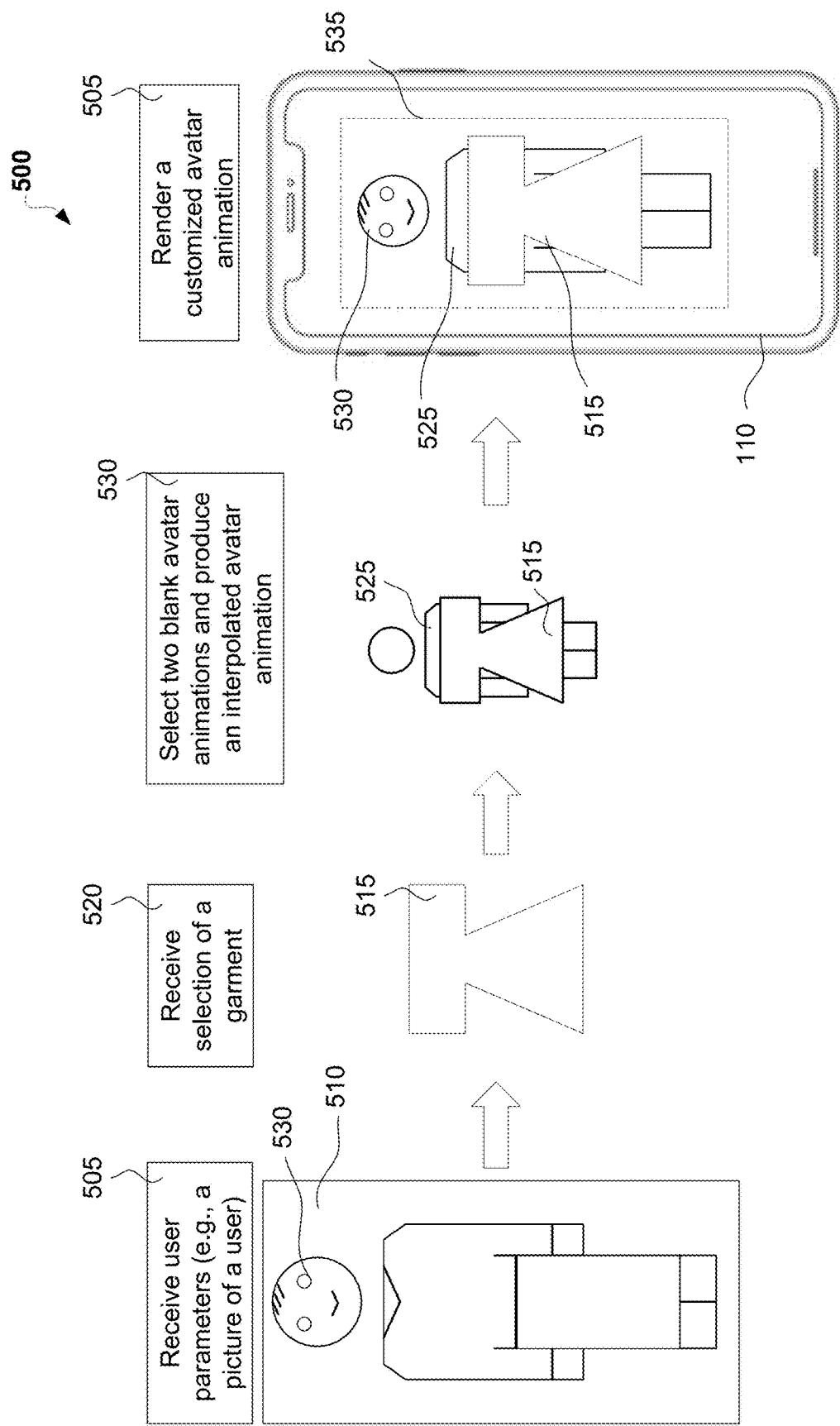
FIG. 5 is a schematic diagram illustrating interaction of a user with a system for automatic creation of a customized avatar animation of a user, according to an example embodiment.

FIG. 5 is a schematic diagram illustrating interaction 500 of a user with the system 200 to obtain a customized avatar animation, according to an example embodiment. The system may receive user parameters from the user in block 505. Specifically, the user may use a user device 110 to make and provide one or more pictures 510 of the user to the system. Upon receiving the user parameters, the system may receive a selection of a garment 515 from the user in block 520. Upon receipt of the selection of the garment 515, the system may select two blank avatar animations having parameters closets to the user parameters and produce an interpolated avatar animation 525 in block 530. The system may further take a face 530 and hair of the user from the picture 510 and compose the face 530 and hair into the interpolated avatar animation 525 to create a customized avatar animation 535. The system may render the customized avatar animation 535 on the user device 110.

In an example embodiment, the production module or the runtime module may be further configured to receive a selection of a garment from the user and, upon receiving the selection of the garment, resize the garment for one or more of the plurality of blank avatar animations. The garment may be selected from one of the following: a user closet, an influencer closet, a brand closet, and so forth. The production module or the runtime module may be further configured to design a 3D garment using the resized garment.

Upon designing the 3D garment, the 3D garment may be draped onto the one or more of the plurality of blank avatar animations. Upon draping, physics-based simulation may be performed on the draped 3D garment to render realistic movement of the 3D garment. In an example embodiment, the 3D garment may be designed and draped onto the one or more of the plurality of blank avatar animations simultaneously with the composition of the face and the hair with the interpolated avatar animation. The 3D garment may be designed using a photogrammetry, CAD, or other techniques.

Figure 6:
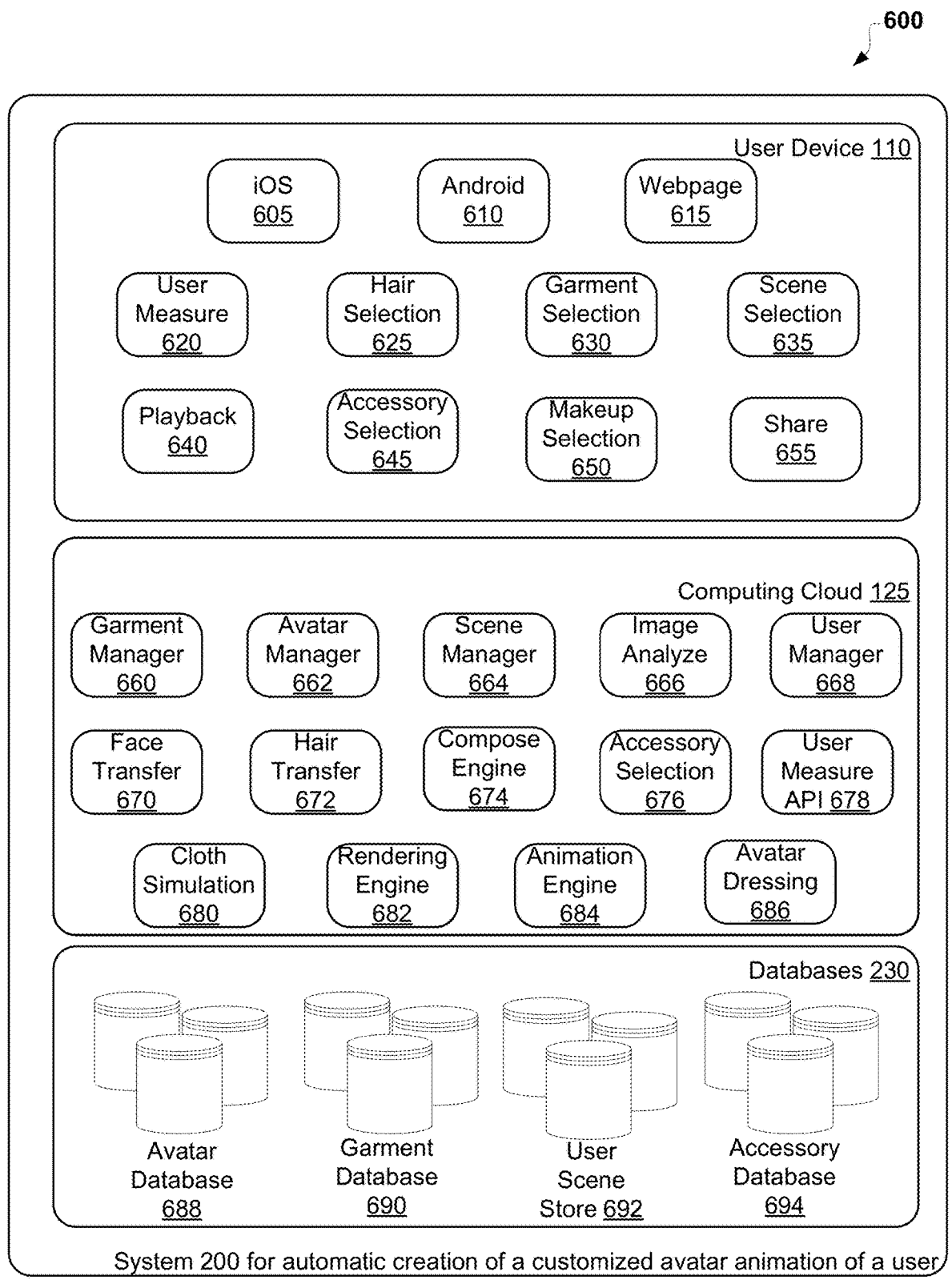
FIG. 6 is a block diagram illustrating modules of a system for automatic creation of a customized avatar animation of a user, according to an example embodiment.

FIG. 6 is a block diagram illustrating modules 600 of a system 200 for automatic creation of a customized avatar animation of a user, according to an example embodiment. The modules 600 of the system 200 may include modules running on a user device 110 associated with the user, modules running in a computing cloud 125, and a database 230 that may include multiple databases.

The modules running on the user device 110 may include an operating system (such as iOS 605 or Android operating system 610), a browser running a webpage 615 associated with the system 200, a user measurement module 620 enabling the user to provide parameters of the user, a hair selection module 625 enabling the user to select/change a hairstyle for the customized avatar animation, a scene selection module 635 enabling the user to select a scene for the customized avatar animation, and a playback module 640 enabling the user to playback the customized avatar animation on the user device 110. The modules running on the user device 110 may further include an accessory selection module 645 enabling the user to select/change accessories for the customized avatar animation, a makeup selection module 650 enabling the user to select/change makeup for the customized avatar animation, and a sharing module 655 enabling the user to share the customized avatar animation, for example, in social networks, in messaging application, via email, and so forth. In an example embodiments, the modules of the user device 110 may be implemented by a processor of the user device 110.

The modules running on the computing cloud 125 may include a garment manager module 660, an avatar manager module 662, a scene manager module 664, an image analyzer module 666, a user manager modules 668, a face transfer module 670, a hair transfer module 672, a compose engine 674, an accessory selection module 676, a user measure application programming interface 678, a cloth simulation module 680, a rendering module 682, an animation engine 684, and an avatar dressing module 686.

The databases 230 of the system 200 may include an avatar database 688, a garment database 690, a user scene store 692, and an accessory database 694.

Figure 7:
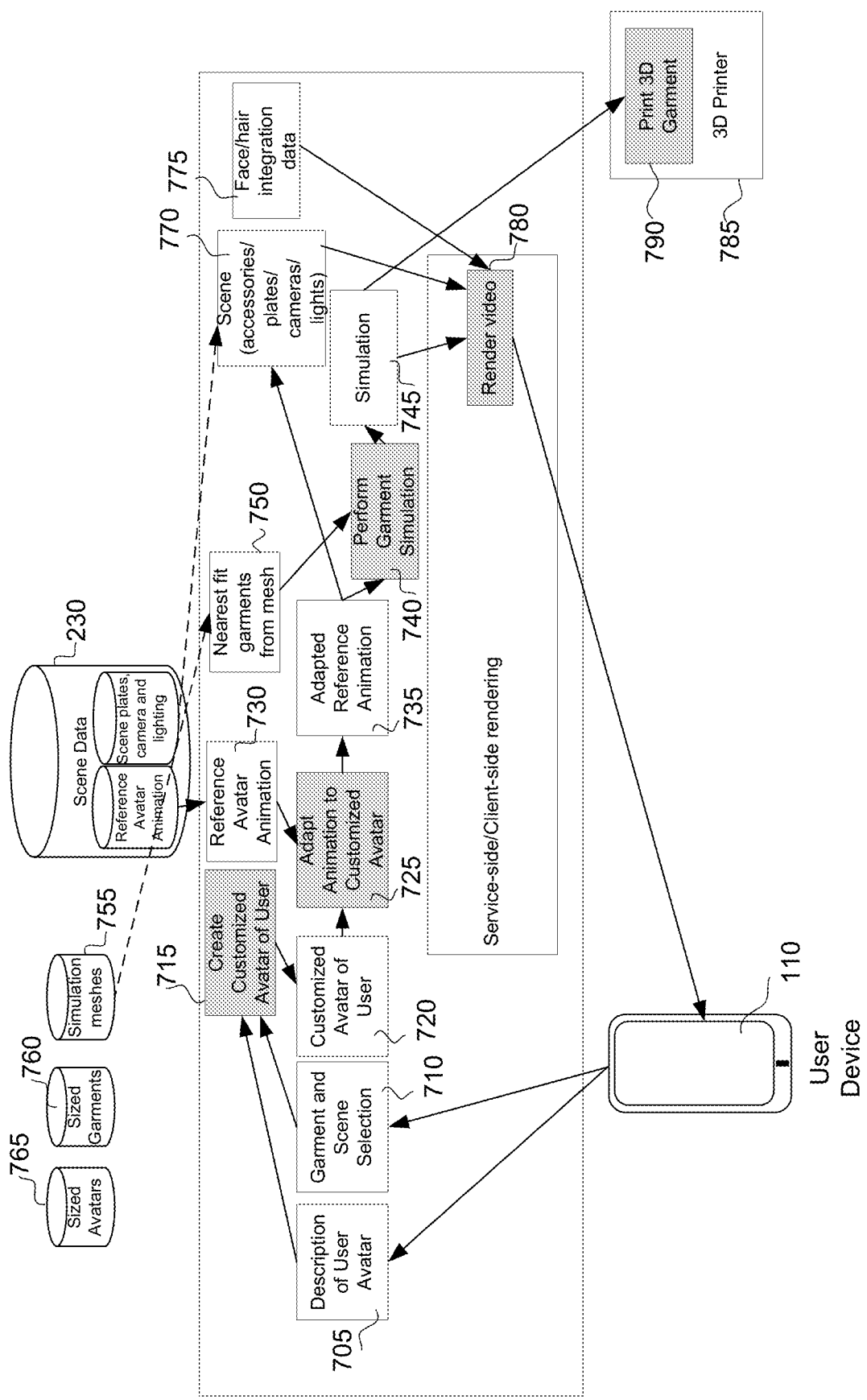
FIG. 7 is a block diagram showing a runtime session run by a system for automatic creation of a customized avatar animation of a user, according to an example embodiment.

FIG. 7 is a block diagram showing a runtime session 700 performed by a system for automatic creation of a customized avatar animation of a user, according to an example embodiment. The runtime session 700 may commence with receiving the description 705 of a user avatar. The description 705 of the user avatar may include body dimensions of the user or images of the user body. The system 200 may further receive garment and scene selection 710 from the user. In block 715, the system 200 may create a customized avatar 720 of the user by selecting, based on the description 705 of the user, a set of the nearest fit avatars from an avatar database and interpolating the set of the nearest fit avatars to generate the customized avatar 720.

In block 725, the system 200 may adapt animation to the customized avatar 720 of the user to generate an adapted reference animation 735 (i.e., an interpolated avatar animation). The animation may be adapted based on reference avatar animation 730. The reference avatar animation 730 may be taken from a database 230. The database may store reference avatar animations, scene plates, camera and lighting data, and so forth.

In block 740, the system 200 may perform garment simulation to provide a simulation 745 (i.e., an interpolated garment animation). The adapted reference animation 735 can be used for garment interpolation and simulation at block 740, where it can be further modified to conceal portions of a simulation mesh of the avatar by covering them with by the interpolated garment. The garment simulation can be performed using the interpolation algorithms based on a set of nearest fit garments 750 from a 3D mesh of garments. The nearest fit garments 750 may be selected from a database 755 storing simulation meshes of garments including sized avatars 760 and sized garments 765.

The system 200 may further receive scene data 770 from the database 230. The scene data may include data related to accessories, plates, camera data, and lights. The system 200 may further receive face/hair integration data 775. Based on the simulation 745, the scene data 770, and the face/hair integration data 775, the system 200 may render a video in block 780. The video may include the customized avatar animation. The rendering 780 may be performed either on a client side (on the user device 110) or on a server-side (in a cloud with displaying the rendered customized avatar animation on the user device 110). The user device 110 used for displaying the rendered customized avatar animation may act as one of output devices for the system 200.

In an example embodiment, the system 200 may further include or be in communication with a three-dimensional (3D) printer 785. The 3D printer 785 may be configured to construct a 3D object based on a model, such as a computer-aided design (CAD) model or a digital 3D model. The system 200 may send data related to the interpolated garment animation (i.e., an output in a form of the simulation 745) to the 3D printer 785. In block 790, upon receiving the data related to the interpolated garment animation, the 3D printer 785 may print a 3D garment in a form of a physical 3D object based on the received data. The received data associated with the simulation 745 may be used by the 3D printer 785 as a digital 3D model for printing the 3D garment. The 3D printing may be performed by depositing, joining, and/or solidifying a pre-selected material and using other applicable technological processes under computer control to create the 3D garment. In some embodiments, the 3D printing may be performed by a digitally driven loom and/or by any of stitching, weaving, or patterning processes for cloth. The pre-selected material for 3D printing may include plastics, metals, powders, resins, carbon fibers, or any other material applicable for 3D printing. Therefore, the 3D printer 785 used for 3D-printing the 3D garment may act as an output device for the system 200.

Figure 8:
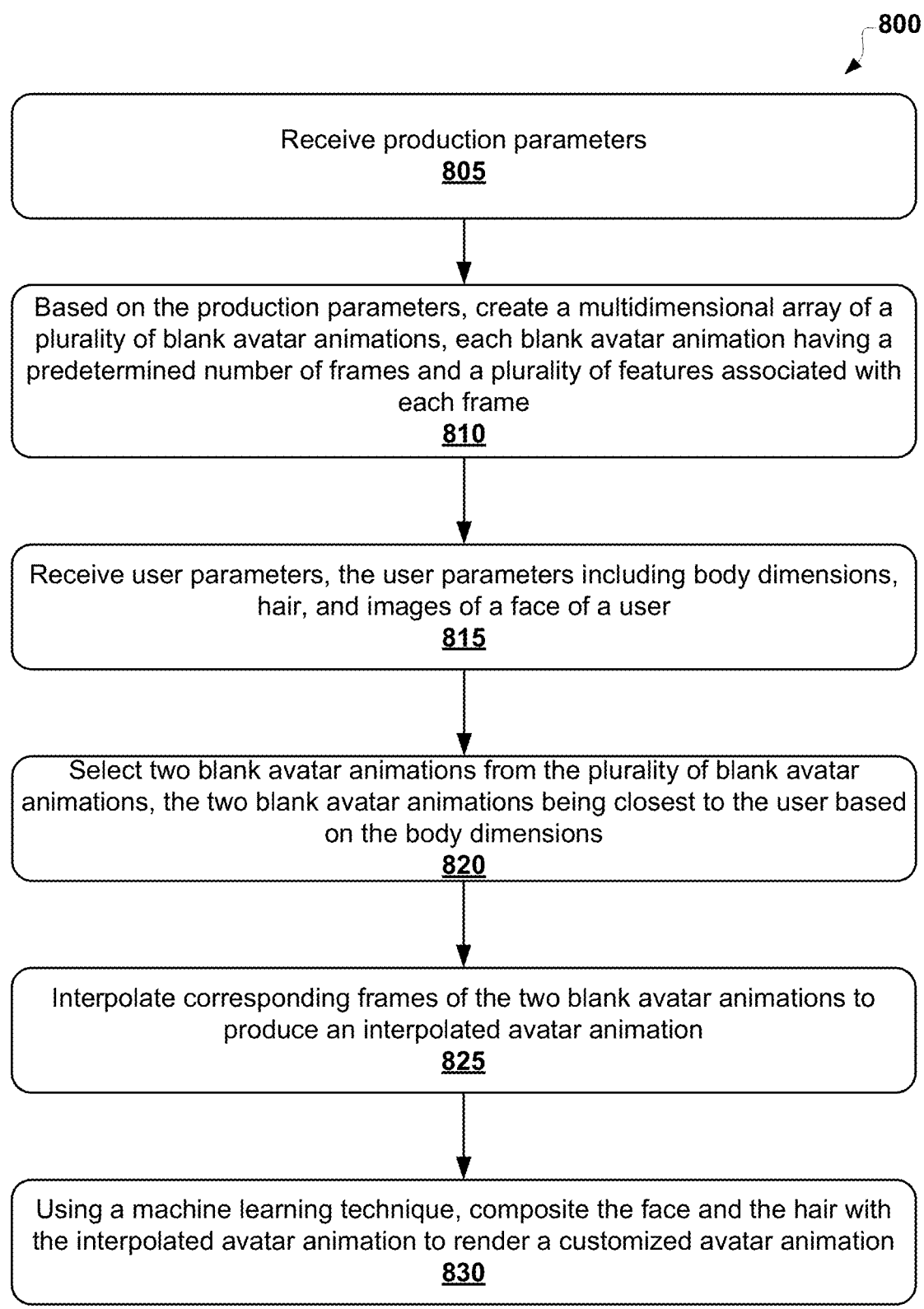
FIG. 8 is a flow diagram that shows a method for automatic creation of a customized avatar animation of a user, according to an example embodiment.

FIG. 8 is a flow diagram that shows a method 800 for automatic creation of a customized avatar animation of a user, according to an example embodiment. The method 800 can be performed by processing logic that may be implemented in hardware (e.g., dedicated logic, programmable logic, or microcode), software (such as software run on a general-purpose computer system or a dedicated machine), or a combination of both. In one example embodiment, the processing logic is collocated with the production module 210 and the runtime module 220 (for instance, they may all execute on the same server).

The method 800 can commence at operation 805 with receiving, by a production module, production parameters.

The production parameters may include one or more of the following: a scenario, a body position, make up, shoes, accessories, an audio, a texture for the garment, a user video, a color of a garment, a user created garment, a pre-rolled video, and so forth.

The method 800 may further include creating at operation 810, by the production module, based on the production parameters, a multidimensional array of a plurality of blank avatar animations. Each blank avatar animation may have a predetermined number of frames and a plurality of features associated with each frame.

The method 800 may further include receiving at operation 815, by a runtime module, user parameters. The user parameters may include body dimensions, hair, and images of a face of a user. The user parameters may further include one or more of the following: a scenario, a body position, make up, shoes, accessories, an audio, a texture for the garment, a user video, a color of a garment, a user created garment, a pre-rolled video, and so forth.

The method 800 may further include selecting at operation 820, by the runtime module, two blank avatar animations from the plurality of blank avatar animations. The two blank avatar animations may be closest to the user based on the body dimensions. The method 800 may further include interpolating at operation 825, by the runtime module, corresponding frames of the two blank avatar animations to produce an interpolated avatar animation. In an example embodiment, the predetermined number of frames is 360.

The method 800 may further include compositing, by the runtime module, at operation 830, the face and the hair with the interpolated avatar animation to render the customized avatar animation. The face and the hair may be composed with the interpolated avatar animation using a machine learning technique.

In an example embodiment, the method 800 may further include receiving a selection of a garment from the user and resizing the garment for one or more of the plurality of blank avatar animations. Upon resizing, a 3D garment may be designed using the resized garment. The 3D garment may be draped onto the one or more of the plurality of blank avatar animations. The 3D garment may be designed and draped onto the one or more of the plurality of blank avatar animations simultaneously with the composition of the face and the hair with the interpolated avatar animation. Upon draping, physics-based simulation on the draped 3D garment may be performed to render realistic movement of the 3D garment.

In an example embodiment, the method 800 may further include capturing a skin color from the images of the face and assigning, based on the skin color, weights to skin tones of different body parts of avatars.

Figure 9:
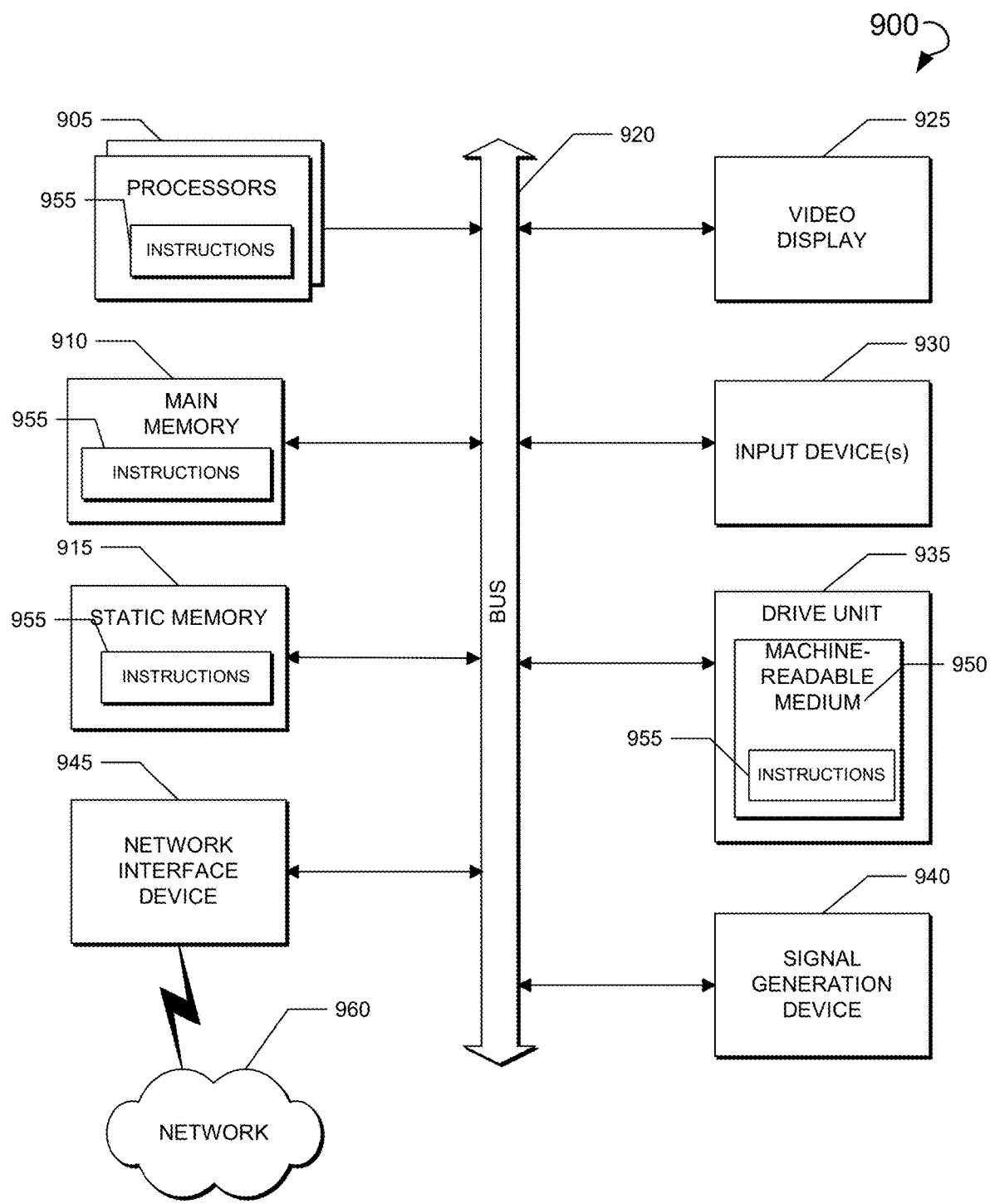
FIG. 9 is a diagrammatic representation of an example machine in the form of a computer system within which a set of instructions for the machine to perform any one or more of the methods discussed herein is executed.

FIG. 9 shows a diagrammatic representation of a computing device or a machine in, for example, the electronic form of a computer system 900, within which a set of instructions for causing the machine to perform any one or more of the methodologies discussed herein can be executed. In some embodiments, the machine operates as a standalone device, while in other embodiments it can be connected (e.g., networked) to other machines. In a networked deployment, the machine can operate in the capacity of a server, a client machine in a server-client network environment, or as a peer machine in a peer-to-peer (or distributed) network environment. The machine can be or comprise a personal computer (PC), tablet PC, cellular telephone, web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methods discussed herein.

In an illustrative embodiment, the computer system 900 comprises at least one processor 905 (e.g., a central processing unit, a GPU, and so on, singly or in combination), and a memory, which in this example comprises a main memory 910 and a static memory 915. The computer system 900 may further comprise a video display 925, a signal generation device 940 (e.g., a speaker), and a network interface device 945. In addition, the computer system 900 may comprise at least one input device 930, such as an alphanumeric input device (e.g., a keyboard), a cursor control device (e.g., a mouse), a microphone, a digital camera, and so forth. Communication among the components may be accomplished via a bus 920. It will be apparent to one of ordinary skill in the art that the computer system 900 can be implemented in a variety of ways—to give just one example, a speech processing system can be used in place of the video display unit 925 and input device 930.

A drive unit 935 includes a computer-readable medium 950, which stores one or more sets of instructions 955 and data embodying or utilized by any one or more of the methods or functions described herein. The instructions 955 can also reside, completely or at least partially, within the main memory 910 and/or within the processors 905 during execution thereof by the computer system 900. The main memory 910 and the processors 905 also constitute machine-readable media.

The instructions 955 can further be transmitted or received over a communications network 960 via the network interface device 945 utilizing any one of a number of well-known transfer protocols (e.g., Hyper Text Transfer Protocol (HTTP), Controller Area Network, Serial, and Modbus). The communications network 960 may include the Internet, local intranet, PAN, LAN, WAN, Metropolitan Area Network, VPN, a cellular network, Bluetooth radio, or an IEEE 802.9-based radio frequency network, and the like.

While the computer-readable medium 950 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methods of the present application, or that is capable of storing, encoding, or carrying data utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory, read only memory, and the like.

The example embodiments described herein can be implemented in an operating environment comprising computer-executable instructions installed on a computer, in software, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written utilizing any number of suitable programming languages such as, for example, HyperText Markup Language (HTML), Dynamic HTML, Extensible Markup Language, Extensible Stylesheet Language, Document Style Semantics and Specification Language, Cascading Style Sheets, Synchronized Multimedia Integration Language, Wireless Markup Language, Java™, Jini™, C, C++, C#, .NET, Adobe Flash, Perl, UNIX Shell, Visual Basic or Visual Basic Script, Virtual Reality Markup Language, ColdFusion™ Objective-C, Scala, Clojure, Python, JavaScript, HTML5 or other compilers, assemblers, interpreters, or other computer languages or platforms, as one of ordinary skill in the art will recognize.

Thus, systems and methods for automatic creation of a customized avatar animation of a user have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for automatic creation of a customized avatar animation of a user, the system comprising:
    a production module configured to:
        receive production parameters;
        based on the production parameters, create a multidimensional array of a plurality of blank avatar animations, each blank avatar animation having a predetermined number of frames and a plurality of features associated with each frame; and
    a runtime module configured to:
        receive user parameters, the user parameters including body dimensions, hair, and images of a face of the user;
        select two blank avatar animations from the plurality of blank avatar animations, the two blank avatar animations being closest to the user based on the body dimensions;
        interpolate corresponding frames of the two blank avatar animations to produce an interpolated avatar animation; and
        using a machine learning technique, composite the face and the hair with the interpolated avatar animation to render the customized avatar animation.

2. The system of claim 1, wherein the production module or the runtime module is further configured to:
    receive a selection of a garment;
    resize the garment for one or more of the plurality of blank avatar animations;
    design a three-dimensional (3D) garment using the resized garment;
    drape the 3D garment onto the one or more of the plurality of blank avatar animations; and
    perform physics-based simulation on the draped 3D garment to render realistic movement of the 3D garment.

3. The system of claim 2, wherein the 3D garment is designed and draped onto the one or more of the plurality of blank avatar animations simultaneously with the composition of the face and the hair with the interpolated avatar animation.

4. The system of claim 2, wherein the 3D garment is designed using one or more of the following techniques: a photogrammetry and computer-aided design (CAD).

5. The system of claim 2, the garment is selected from one of the following: a user closet, an influencer closet, and a brand closet.

6. The system of claim 1, wherein the production parameters and the user parameters include one or more of the following: a scenario, a body position, make up, shoes, accessories, an audio, a texture for the garment, a user video, a color of a garment, a user created garment, and a pre-rolled video.

7. The system of claim 6, wherein the scenario includes one or more of the following: a private jet scene, a yacht scene, a party scene, and a club scene.

8. The system of claim 1, wherein the machine learning includes Generative Adversarial Network (GAN).

9. The system of claim 1, wherein the user parameters are determined based on one or more images of a body of the user, wherein the one or more images are received from the user and analyzed to determine 70 mm-accurate dimensions associated with the body of the user.

10. The system of claim 9, wherein the one or more images of the body include a front picture of the body and a side picture of the body.

11. The system of claim 1, wherein the interpolated avatar animation is skeletally rigged.

12. The system of claim 1, wherein the predetermined number of frames is 360.

13. The system of claim 1, wherein the production module or the runtime module is further configured to:
    capture a skin color from the images of the face; and
    based on the skin color, assign weights to skin tones of different body parts of avatars.

14. The system of claim 1, wherein the runtime module is further configured to perform one or more of the following actions on the customized avatar animation: render in a cloud on graphics processing units and cloud farms, scale based on demand, encode with a compression technique, encrypt, copy, protect, add to a blockchain, digitally sign, stream through an application on a mobile device or a web application, and tag.

15. A method for automatic creation of a customized avatar animation of a user, the method comprising:
    receiving, by a production module, production parameters;
    based on the production parameters, creating, by the production module, a multidimensional array of a plurality of blank avatar animations, each blank avatar animation having a predetermined number of frames and a plurality of features associated with each frame;
    receiving, by a runtime module, user parameters, the user parameters including body dimensions, hair, and images of a face of the user;
    selecting, by the runtime module, two blank avatar animations from the plurality of blank avatar animations, the two blank avatar animations being closest to the user based on the body dimensions;
    interpolating, by the runtime module, corresponding frames of the two blank avatar animations to produce an interpolated avatar animation; and
    using a machine learning technique, compositing, by the runtime module, the face and the hair with the interpolated avatar animation to render the customized avatar animation.

16. The method of claim 15, further comprising:
    receiving a selection of a garment;
    resizing the garment for one or more of the plurality of blank avatar animations;

designing a three-dimensional (3D) garment using the resized garment;

draping the 3D garment onto the one or more of the plurality of blank avatar animations; and performing physics-based simulation on the draped 3D garment to render realistic movement of the 3D garment.

17. The method of claim 16, wherein the 3D garment is designed and draped onto the one or more of the plurality of blank avatar animations simultaneously with the composition of the face and the hair with the interpolated avatar animation.

18. The method of claim 15, wherein the 3D garment is designed using one or more of the following techniques: a photogrammetry and computer-aided design (CAD).

19. The method of claim 15, further comprising:

capturing a skin color from the images of the face; and based on the skin color, assigning weights to skin tones of different body parts of avatars.

20. A system for automatic creation of a customized avatar animation of a user, the system comprising:

a production module configured to:

receive production parameters;

based on the production parameters, create a multidimensional array of a plurality of blank avatar animations, each blank avatar animation having a predetermined number of frames and a plurality of features associated with each frame; and a runtime module configured to:

receive user parameters, the user parameters including body dimensions, hair, and images of a face of the user;

select two blank avatar animations from the plurality of blank avatar animations, the two blank avatar animations being closest to the user based on the body dimensions;

interpolate corresponding frames of the two blank avatar animations to produce an interpolated avatar animation;

using a machine learning technique, composite the face and the hair with the interpolated avatar animation to render the customized avatar animation;

receive a selection of a garment;

resize the garment for one or more of the plurality of blank avatar animations;

design a three-dimensional (3D) garment using the resized garment;

drape the 3D garment onto the one or more of the plurality of blank avatar animations, wherein the 3D garment is designed and draped onto the one or more of the plurality of blank avatar animations simultaneously with the composition of the face and the hair with the interpolated avatar animation; and perform physics-based simulation on the draped 3D garment to render realistic movement of the 3D garment.

* * * * *